US009383537B2

(12) United States Patent
Beamon et al.

(10) Patent No.: US 9,383,537 B2
(45) Date of Patent: Jul. 5, 2016

(54) CASSETTE AND DROP HANDLE WITH FLEXIBLE RADIUS CONTROLLER (71) Applicant: CORNING OPTICAL COMMUNICATIONS LLC, Hickory, NC (US)

(72) Inventors: Hubert Blair Beamon, Watauga, TX (US); William Julius McPhil Giraud, Azle, TX (US); Diana Rodriguez, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/467,181

(22) Filed: Aug. 25, 2014

(65) Prior Publication Data

US 2015/0063772 A1  Mar. 5, 2015

Related U.S. Application Data (60) Provisional application No. 61/870,897, filed on Aug. 28, 2013.

(51) Int. Cl.
*G02B 6/44* (2006.01)
(52) U.S. Cl.
CPC ............ *G02B 6/4453* (2013.01); *G02B 6/4471* (2013.01)
(58) Field of Classification Search
CPC ............................ G02B 6/4453; G02B 6/4471
USPC ......................................... 385/135–139, 147
See application file for complete search history.

(56) References Cited

U.S. PATENT DOCUMENTS

| 5,067,784 A * | 11/1991 | Debortoli ............. G02B 6/3897 385/135 |
| 5,461,690 A | 10/1995 | Lampert ........................ 385/100 |
| 2001/0054683 A1 * | 12/2001 | Kohda .................. A61B 6/5258 250/235 |
| 2008/0298763 A1 | 12/2008 | Appenzeller et al. .......... 385/135 |
| 2010/0054683 A1 | 3/2010 | Cooke et al. .................... 385/135 |

FOREIGN PATENT DOCUMENTS

WO    WO 2014/189731 A1    11/2014    ............... G02B 6/44

OTHER PUBLICATIONS

Patent Cooperation Treaty International Search Report for application No. PCT/US2014/052456, Mail Date Feb. 13, 2015, 12 pages.
"Application Engineering Note—Multimode Fiber in Bending," AN4255, Issued: Apr. 2005, XP55166775AI.

* cited by examiner

*Primary Examiner* — Akm Enayet Ullah
(74) *Attorney, Agent, or Firm* — Brad Christopher Rametta (57) ABSTRACT

Cassettes for optical cables with a plurality of adapters for connecting external devices to the cassette. The cassettes may be hingedly connected to a drop handle that is configured to inhibit access to the plurality of adapters when in a stored position, and allows access when in an open position. The drop handle includes a channel configured to guide cables to at least one side of the cassette while maintaining their connection to the plurality of adapters. The cassettes may also include an opening configured to allow the cables to exit the drop handle on at least one side of the cassette. A flexible radius controller may be connected to the opening and is configured to flex when the cassette is removed from a housing.

21 Claims, 7 Drawing Sheets

CASSETTE AND DROP HANDLE WITH FLEXIBLE RADIUS CONTROLLER

RELATED APPLICATIONS

This application claims the benefit of priority under 35 U.S.C. §119 of U.S. Provisional Application 61/870,897 filed on Aug. 28, 2013, the content of which is relied upon and incorporated herein by reference in its entirety.

BACKGROUND

1. Field of the Disclosure

The disclosure relates generally to optical cable apparatus more particularly to fiber optic cassettes having a drop handle with controllers for fiber optic cables.

2. Technical Background

In optical cable networking apparatus including convergence points and distribution frames, such as in fiber-optics networking, there is a constant demand for components permitting high-density distribution with very high fiber termination counts in a small, confined volume. Accomplishing the high-density distribution with high fiber termination counts requires efficient utilization of space with due regard to constraints put on optical cables, such as minimum bending radius. As such, an ongoing need exists for optical-cable networking components that can effectively utilize a confined volume when large numbers of optical cables are present, while simultaneously avoiding sharp bends to the optical cables.

No admission is made that any reference cited herein constitutes prior art. The Applicants expressly reserve the right to challenge the accuracy and pertinence of any cited documents.

SUMMARY

One embodiment relates to a cassette for optical cables that comprises a plurality of adapters for connecting external devices to the cassette. The cassette comprises a drop handle that is hingedly connected to the cassette and configured to inhibit access to the plurality of adapters when in a closed position, and the drop handle allows access to the plurality of adapters when in an open position. The drop handle comprises a channel configured to guide cables connected to the plurality of adapters to at least one side of the cassette, a first opening on a side adjacent to the plurality of adapters and configured to allow the cables into the channel while maintaining their connection to the plurality of adapters, and a second opening on a side adjacent to the first opening and configured to allow the cables to exit the drop handle on the at least one side of the cassette. A flexible radius controller is connected to the second opening.

An additional embodiment relates to a drop handle that comprises a channel configured to guide cables connected to a plurality of adapters to a side of a cassette, a first opening on a side adjacent to the plurality of adapters and configured to allow the cables into the channel while maintaining their connection to the plurality of adapters, and a second opening on a side adjacent to the first opening and configured to allow the cables to exit the drop handle on a side of the cassette. A flexible radius controller is connected to the second opening, and the flexible radius controller bends toward the first opening at a bend radius of greater than or equal to about 0.75 inches to less than or equal to about 3.0 inches, and has a Durometer hardness of from greater than or equal to about 50 to less than or equal to about 70.

Additional features and advantages will be set forth in the detailed description which follows, and in part should be readily apparent to those skilled in the art from the description or recognized by practicing the embodiments as described in the written description and claims hereof, as well as the appended drawings. It is to be understood that both the foregoing general description and the following detailed description describe various embodiments and are intended to provide an overview or framework for understanding the nature and character of the claimed subject matter.

The accompanying drawings are included to provide a further understanding, and are incorporated in and constitute a part of this specification. The drawings illustrate one or more embodiment(s), and together with the description serve to explain principles and operation of the various embodiments.

Cartesian axes are shown in the figures for the sake of reference only and are not intended to be limiting with respect to direction or orientation. Additionally, for sake of reference only and not by way of limitation, the Cartesian axes shown in the figures include arrows that consistently define a particular direction with respect to each axis in all figures that depict the same object in different orientations. Throughout this disclosure, relational terms will be used by a convention in view of the Cartesian axes of the figures and the positive directions indicated by the arrows. According to the convention, relationships relative to the x-axis of any object may be expressed using terms such as left, right, to the left of, or to the right of. According to the convention, relationships relative to the y-axis of any object may be expressed using terms such as front, back, in front of or proximal to, or behind or distal to. According to the convention, relationships relative to the z-axis of any object may be expressed using terms such as top, bottom, above, below, over, or under. Neither the convention nor the terms used to express various relationships are intended to limit any object or component thereof to a direction or orientation in construction or in use.

DETAILED DESCRIPTION

Figure 1:
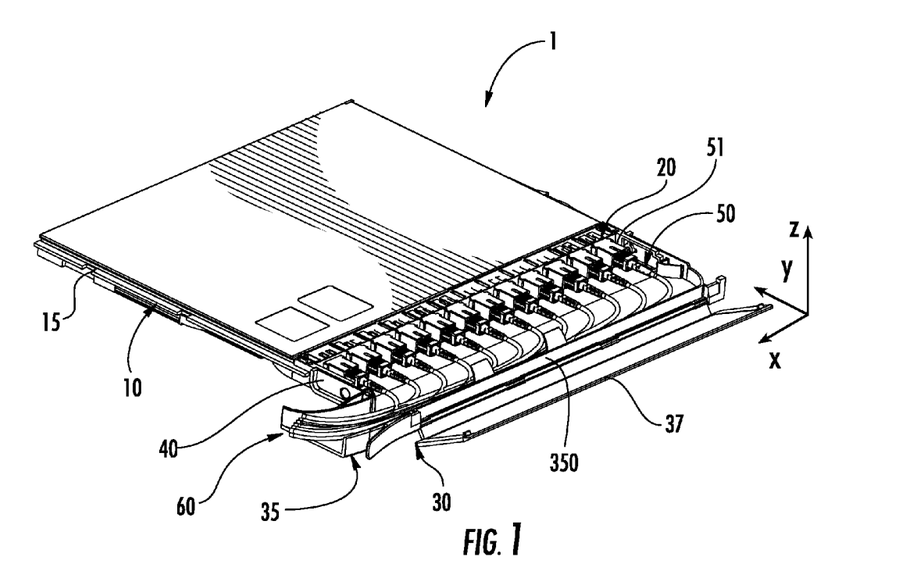
FIG. 1 is a perspective view of a cassette tray base and a device holder according to one or more embodiments described herein with a drop handle in a stored position.
Figure 2:
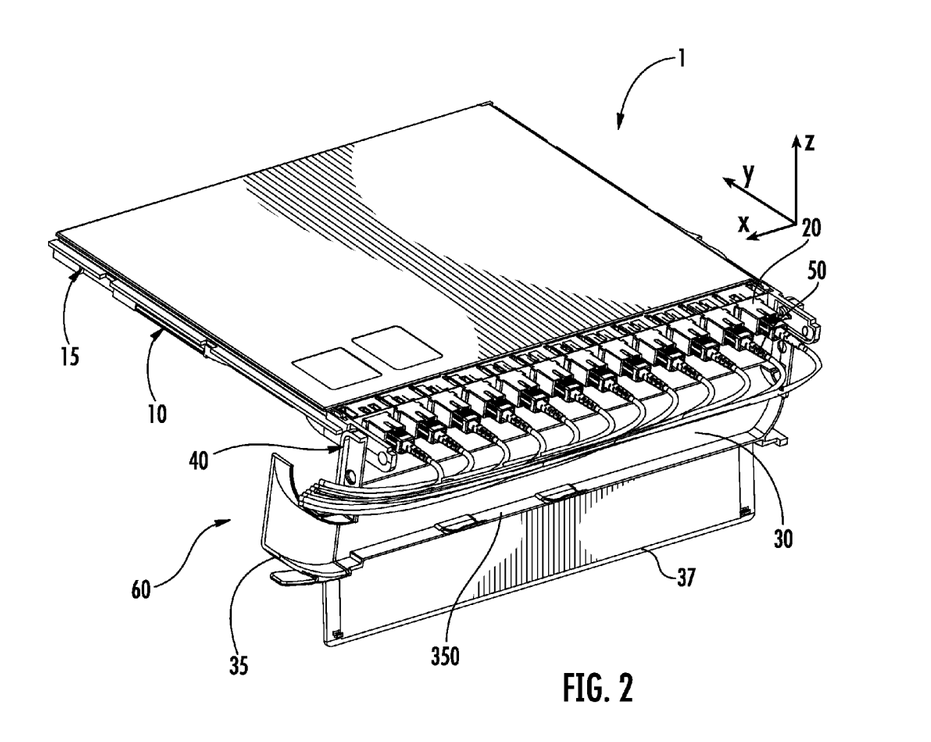
FIG. 2 is a perspective view of a cassette tray base and a device holder according to one or more embodiments described herein with a drop handle in an access position.

Embodiments of cassettes for optical cables and drop handles pertaining thereto will now be described with reference to the figures. Referring to FIGS. 1 and 2, a cassette 1 (e.g., a splice cassette) may include a tray base 10. The cassette 1 may contain one or more additional features shown in the figures. For example, referring to FIG. 1, the cassette 1 may include plurality of adapters 20 for connecting external devices (not shown) via fiber optical cables 50 terminated with a fiber optic connector 51 to optical cables disposed within the cassette 1. According to embodiments, the cassette 1 may include a drop handle 30 having a radius controller 35 positioned on at least one side of the drop handle 30. The drop handle 30 may cover or at least partially cover the plurality of adapters 20 when the plurality of adapters 20 are not in use or may protect cables 50 that are plugged into the plurality of adapters 20 when the plurality of adapters 20 are in use by placing the drop handle 30 in a stored position (e.g., a closed position). The drop handle 30 may be moved, rotated, or pivoted from the stored position as shown in FIG. 1 to an access position (e.g., an open position) to allow access to the plurality of adapters 20 as shown in FIG. 2. Although the two positions of the drop handle are referred to herein as a stored position and an access position, limited access to the adaptors is provided even when the drop handle is in the stored position via the top of the drop handle as shown in FIG. 1. The drop handle 30 may move from the access position to the stored position, and vice versa, by moving about pivot or hinge 40 that allows the drop handle 30 to swing up and down, thereby providing or denying access to the plurality of adapters 20 or cables 50, or at least limiting the access to the plurality of adaptors 20 and cables 50. To further protect the cables 50 or the plurality of adaptors 20 that the cables 50 are connected to, in some embodiments the drop handle 30 may comprise a cover 37 that is hingedly or detachably attached to the drop handle 30.

In addition to protecting cables 50, in embodiments, the drop handle 30 may also be configured to organize and guide the cables 50 connected to a plurality of adapters 20 in a given cassette 1. For example, if the cables 50 connected to a plurality of adapters 20 are permitted to extend straight out of the plurality of adapters 20 (i.e., if the drop handle 30 were not present in FIG. 1) the cables 50 may extend out in the y-direction and hang down in the z-direction, thereby obstructing access to pluralities of adapters in other cassettes that might be present in a housing (not depicted). Therefore, in some embodiments, the drop handle 30 guides the cables 50 connected to the plurality of adapters 20 away from and to one side (i.e., the left or right side in the x-direction) of the cassette. In other embodiments, the drop handle 30 may guide the cables 50 connected to the plurality of adapters 20 to both sides of the cassette 1. For example, in such embodiments, one or more of the cables 50 connected to the plurality of adapters 20 may be guided by the drop handle to the left side of the cassette 1 in the x-direction and one or more of the cables 50 connected to the plurality of adapters 20 may be guided to the right side of the cassette 1 in the x-direction.

Figure 3:
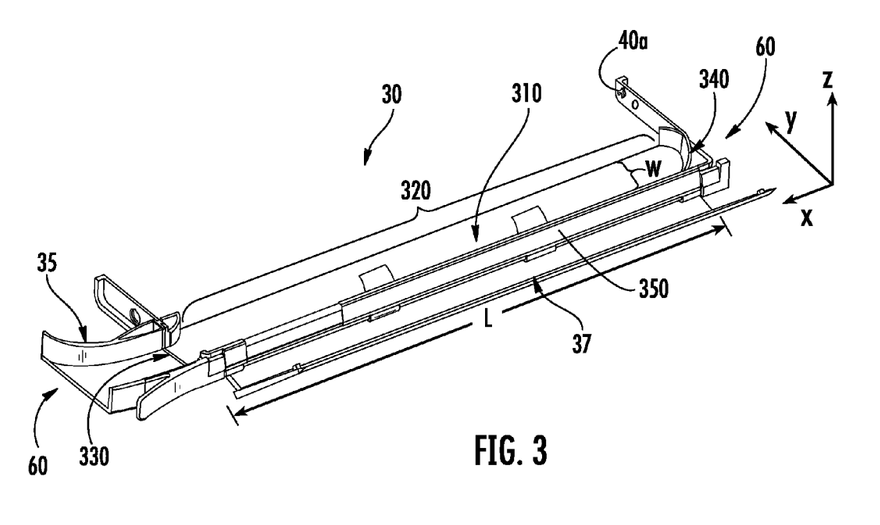
FIG. 3 is a perspective top view of a drop handle having one flexible radius controller according to one or more embodiments described herein.

Embodiments of the drop handle 30 will be described in more detail below referring to FIGS. 3 and 4. As mentioned above, the drop handle 30 may be hingedly connected to the cassette base plate 10. As shown in FIG. 3, some embodiments of the drop handle 30 provide the hinged connection with a protrusion 40a that is configured to hingedly engage with an aperture or receiver (not shown) in the base plate 10 of the cassette 1. However, it should be understood that the protrusion 40a may be on the base plate 10 and the corresponding aperture may be on the drop handle 30. Further, it should be understood that other hinged connections may be used without deviating from the scope of embodiments described herein. The hinged connection between the drop handle 30 and the base plate 10 will be described in more detail below.

In some embodiments, the drop handle may include a channel 310 that is configured to guide cables 50 that are connected to the plurality of adapters 20 to one or more sides of the cassette 1. According to embodiments depicted in FIG. 3, the channel 310 is configured to guide cables 50 (e.g., as shown in FIG. 1) that are connected to the plurality of adapters 20 (e.g., as shown in FIG. 1) to the left side of the cassette (i.e., in the x-direction). However, it should be understood that in other embodiments the channel 310 may be configured to guide cables 50 that are connected to the plurality of adapters 20 to the right side of the cassette, or the channel 310 may be configured to guide cables 50 that are connected to the plurality of adapters 20 to the left of the cassette and the right of the cassette. The channel 310 may include a first opening 320 that is configured to be adjacent to the plurality of adapters 20 when the drop handle 30 is hingedly connected to the cassette 1. The first opening 320 is configured to allow the cables 50 that are connected to the plurality of adapters 20 to enter the channel 310 while maintaining the connection between the cables 50 and the plurality of adapters 20. In embodiments, the drop handle 30 comprises a second opening 330 on a side adjacent to the first opening 320 that is configured to allow the cables 50 to exit the channel 310 in the drop handle 30 on at least one side of the cassette. Although FIG. 3 shows the second opening 330 on the left side of the drop handle, it should be understood that the second opening 330 may be on the right side of the drop handle 30.

In embodiments where the cables 50 connected to the plurality of adapters 20 are guided through the channel 310 to one side of the cassette 1 such as shown in FIG. 3, a side 60, disposed opposite to the second opening 330 and adjacent to the first opening 310, may include a wall 340 that is configured with a bend radius from greater than or equal to about −1.0 inches to less than or equal to about 3.0 inches, such as from greater than or equal to about 1.5 inches to less than or equal to about 2.5 inches. The bend radius of the wall 340 may be configured such that it gently bends the cables 50 that are connected to the plurality of adapters 20 toward the second opening 330 if the cables 50 contact the wall 340. However, it should be understood that in some embodiments the wall 340 may not have a bend radius and may substantially form a 90° angle with a front wall 350 of the channel 310.

Figure 4:
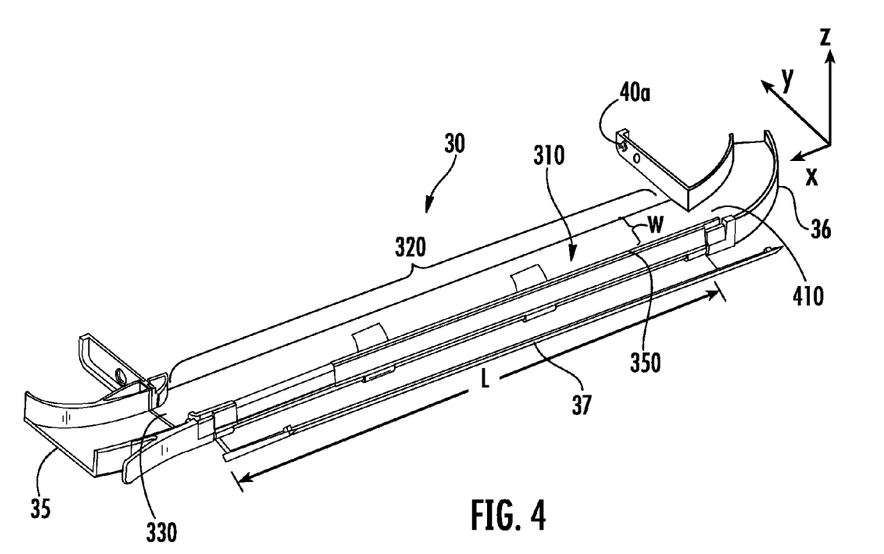
FIG. 4 is a perspective top view of a drop handle having two flexible radius controllers according to one or more embodiments described herein.

Referring now to FIG. 4, in some embodiments, the drop handle 30 comprises a third opening 410 that is adjacent to the first opening 320 and the front wall 350 and is opposite to the second opening 330. The third opening may be configured to allow cables 50 connected to the plurality of adapters 20 to exit the channel 310 to a side of the cassette 1 while maintaining the connection between the cables 50 and the plurality of adapters 20.

The dimensions of the channel 310, the first opening 320, the second opening 330, and, when present, the third opening are not particularly limited and may be any value suitable to accommodate and guide the cables 50 to at least one side of the cassette 1. In some embodiments, the width W of the channel (i.e., in the y-direction) may be such that it allows the cables 50 to gently bend toward the second opening 330 and, when present, the third opening 410. If the width W of the channel 310 is too small, the cables 50 may be bent at a sharp angle, which may damage or break the cables leading to a poor or broken connection between the external device and the cassette. However, if the width W of the channel 310 is too large, valuable space within the holder may unnecessarily be consumed, and the cables 50 may have too much flexibility allowing the connection between the cables 50 and the plurality of adapters 20 to be jostled and compromised. Accordingly, in embodiments, the width W of the channel 310 may be greater than or equal to about 1.0 inches and less than or equal to about 2.0 inches, such as greater than or equal to about 1.25 inches and less than or equal to about 1.75 inches. In embodiments, the length L of the channel 310 may be sufficient to guide cables away from the cassette 1. Therefore, in some embodiments, the length L of the channel 310 is approximately equal to the length of the cassette 1. In some embodiments, the length L of the channel 310 is greater than the length of the cassette. The dimensions of the second and third openings may be selected to accommodate the number of cables that are to exit the drop handle through that opening. Accordingly, a span of the second opening 330 and a span of the third opening 410 may be the same or different, depending on the number of cables 50 that are to exit the drop handle at each respective opening. In embodiments, the span of the second or third opening may be greater than or equal to about 5.0 inches and less than or equal to about 12.0 inches, such as greater than or equal to about 6.0 inches and less than or equal to about 11.0 inches. In other embodiments, the span of the second or third opening may be greater than or equal to about 7.0 inches and less than or equal to about 10.0 inches, such as greater than or equal to about 8.0 inches and less than or equal to about 9.0 inches.

Figure 5:
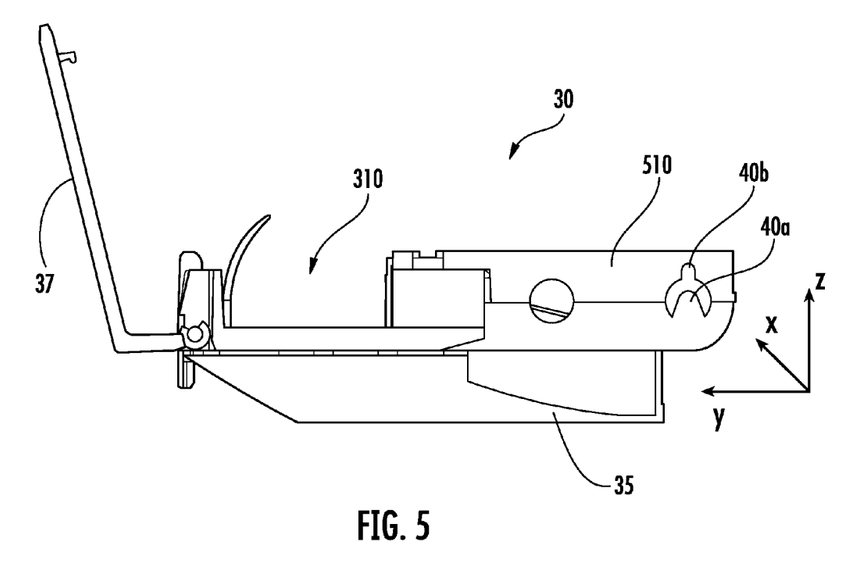
FIG. 5 is a side view of a drop handle according to one or more embodiments described herein.
Figure 6:
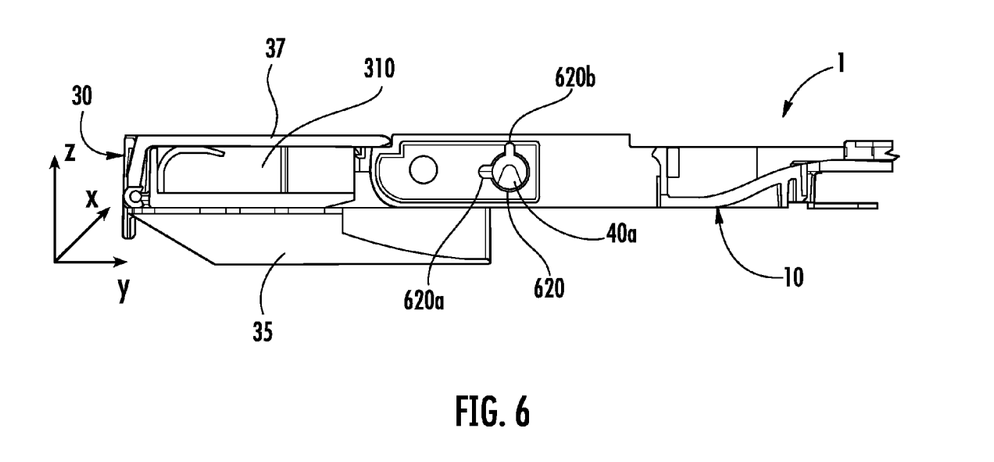
FIG. 6 is a side view of a drop handle and a partial side view of a cassette according to one or more embodiments described herein.

The pivot or hinge 40 that allows the drop handle 30 to move from the access position to the stored position will be described in more detail referring to FIGS. 5 and 6. FIG. 5 is a side view of the drop handle 30 according to embodiments, FIG. 6 is a side view of the cassette 1 and drop handle 30 hingedly connected thereto as depicted in FIG. 5. As shown in FIG. 5, some embodiments of the drop handle 30 comprise a protrusion 40a on an attachment portion 510. The protrusion 40a may be positioned on the inside (i.e., in the x-direction) of the attachment portion, or on the outside of the attachment portion. In the embodiments depicted in FIG. 5, the protrusion 40a comprises an oblong portion 40b that facilitates the hinged connection between the drop handle 30 and the cassette 1. As shown in FIG. 6, the cassette 1 includes an attachment portion 610 with an aperture 620. The aperture 620 comprises an oblong detents 620a, 620b that may be aligned and with the oblong portion 40b of the protrusion 40a. For example, in embodiments, the protrusion 40a and the aperture 620 may mate (e.g., the oblong portion 40b of the protrusion aligns with a detent 620a or 620b of the aperture 620) when the drop handle is at a predetermined angle to the cassette (e.g., the drop handle 30 is in the access position or the stored position). However, when the drop handle is not in the access position or in the stored position, the protrusion 40a and the aperture 620 may not mate.

The first protrusion 40a may engage or insert into an aperture 620 of the cassette 1 (e.g., FIGS. 1, 2), and may be operable to lock the drop handle 30 in, for example, the access position or the stored position. For example, an oblong portion 40b may engage a first detent 620a of the aperture 620 to hold or lock the drop handle 30 in the stored position as shown in FIG. 1. The cassette may also comprise a second detent 620b that is angularly spaced from the first detent 620a such that when the drop handle 30 is moved from the stored position, the oblong portion 40b may disengage from the first detent 620a and move, rotate, or pivot until the oblong portion 40b engages the second detent 620b. When the oblong portion 40b is engaged with the second detent 620b, it holds or locks the drop handle 30 in the access position as shown in FIG. 2. In embodiments, the hinged connection described above may be present on both sides of the cassette 1 and drop handle 30 to provide added stability when the drop handle is in the access and stored position. However, it should be understood that any other hinged connection may be used to connect the drop handle 30 to the cassette 1, such as mechanical hardware, for example, rivets and screws.

In some embodiments, the cassette 1 may be one of a number of cassettes removably positioned in a housing (not shown). For example, referring again to FIG. 1, in some embodiments, the cassette 1 may be removably positioned to the housing by one or more grooves 15 in the side of the base tray 10 that mechanically couple with protrusions in the housing to secure the cassette 1 into the housing. As an alternative, or in addition, to the grooves 15 in the base tray 10, a clip or other type of fastener may be used to removably position the cassette 1 to the housing. It should be understood that many mechanisms could be used to removably position the cassette 1 to the housing without deviating from the scope of embodiments disclosed herein. To fully access a particular cassette, such as to perform maintenance or to add connections, the cassette may need to be removed from the housing. In such an instance, the cassette 1 may be moved forward, for example, in the y-direction, to gain access to the cassette. In many situations, it is desirable to maintain the connection between the cables 50 and the plurality of adapters 20 during the maintenance. Such movement can place bending stress on the cables 50 that are attached to the plurality of adapters 20. Particularly, bending stress may be applied to the cables 50 that are attached to the plurality of adapters by the radius controller 35 when the cassette is moved. Accordingly, in embodiments disclosed herein, the radius controller 35 may be comprised of a flexible material (hereinafter referred to as the "flexible radius controller"), and it may be configured to flex and gently bend the cables 50 when the cassette 1 is removed from the housing. In addition to being made from a flexible material, configurations of the flexible radius controller 35, such as the bend radius and slope of the flexible radius controller 35 in relation to the channel 310 may be such that stress on the cables 50 is mitigated when the cassette 1 is removed from the housing. The flexible radius controller 35 may be connected to the channel 310 of the drop handle 30 via the second opening 330 and, when present, a second flexible radius controller 36 may be connected to the channel 310 via the third opening 410, as shown in FIG. 4.

In embodiments, the flexible radius controller 35 may be made from any material that will flex upon contact with the cables 50. If the flexible radius controller is made from a material that is not flexible enough, it will supply bending stress on the cables. However, if the flexible radius controller is made from a material that is too flexible, it will not provide the requisite guidance or direction control to the cables 50, and the cables 50 may tangle or otherwise become damaged upon movement of the cassette. Therefore, according to some embodiments, the flexible radius controller is made from a material that has a Durometer hardness of from greater than or equal to about 50 to less than or equal to about 70, such as greater than or equal to about 55 to less than or equal to about 65. In other embodiments, the flexible radius controller is made from a material that has a Durometer hardness of from greater than or equal to about 57 to less than or equal to about 62. In yet other embodiments, the Durometer hardness may be about 60, about 55, or even about 65.

The flexible radius controller 35 may be made from any suitable material and, in some embodiments, any material meeting the above Durometer hardness may be used to form the flexible radius controller 35. However, in some embodiments, the flexible radius controller is made from elastomers, natural rubbers, Neoprenes (polychloroprenes), propylenes, styrene-ethylene/butylene-styrene (SEBS), styrene-ethylene/propylene-styrene (SEPS), and mixtures thereof. In some embodiments, the flexible radius controller 35 is made from silicone-containing elastomers, thermoplastic vulcanizates, urethanes, ethylenes, and mixtures thereof. In yet other embodiments, the flexible radius controller is made of Evoprene®, Kraton®, Santoprene®, and mixtures thereof. In embodiments where the drop handle 30 comprises second and third openings and a second flexible radius controller 36, the flexible radius controller 35 and the second flexible radius controller may be made from the same material. In other embodiments, the flexible radius controller and the second flexible radius controller may be made from different materials.

The flexible radius controller 35 and, when present, the second flexible radius controller 36 may be connected to the drop handle 30 via the second opening 330 or, when present the third opening 410, by any suitable mechanism. For example, in some embodiments, the flexible radius controller 35 and, when present, the second flexible radius controller 36 may be connected to the drop handle 30 by an adhesive or a physical connector, such as a clip or a snap fitting. In some embodiments, the flexible radius controller 35 and, when present, the second flexible radius controller 36 is overmolded onto the drop handle. In some embodiments, the flexible radius controller(s) 35, 36 may be attached by an adhesive, or mechanically attached, such as by, for example, crimping. In embodiments where the flexible radius controller 35 and, when present, the second flexible radius controller 36 are connected to the drop handle 30 by over molding, the material of the drop handle 30 may be selected to be compatible with such a process. Accordingly, in some embodiments, the drop handle 30 is made from polycarbonates, ABS plastics, polybutylene terephthalates, and mixtures thereof.

Figure 7:
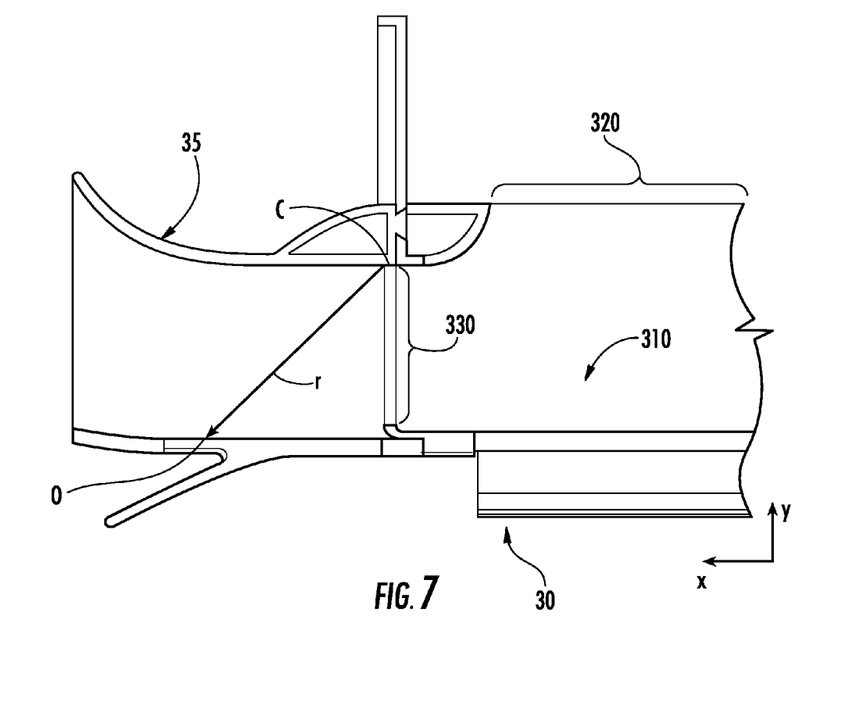
FIG. 7 is a perspective top view of a flexible radius controller according to one or more embodiments described herein.

According to embodiments, and with reference to FIG. 7, which is a partial perspective view of the flexible radius controller 35 and drop handle 30, the flexible radius controller 35 may be configured with a bend radius r extending from a center point C of the flexible radius controller 35 to a point O on the outer circumference of the flexible radius controller 35 that gently bends the cables 50 away from the cassette 1 as the flexible radius controller 35 guides the cables 50 out of the channel 310. If the bend radius r is too large, the flexible radius controller 35 may not provide sufficient guidance to the cables 50 as they exit the channel 310, which may lead to tangling and other damage of the cables 50. However, if the bend radius r of the flexible radius controller 35 is too small, the cables will be bent at an angle that may create bending stresses on the cables and thereby cause damage to the cables. Accordingly, in some embodiments, the bend radius r of the flexible radius controller 35 may be from greater than or equal to about 0.75 inches to less than or equal to about 3.0 inches, such as from greater than or equal to about 1.00 inches to less than or equal to about 2.75 inches. In other embodiments, the bend radius r of the flexible radius controller 35 may be from greater than or equal to about 1.25 inches to less than or equal to about 2.50 inches, such as from greater than or equal to about 1.50 inches to less than or equal to about 2.25 inches. In other embodiments, the bend radius r of the flexible radius controller 35 may be about 0.75 inches, about 1.00 inches, or about 1.25 inches. In yet other embodiments, the bend radius r of the flexible radius controller 35 may be about 1.50 inches, about 2.00 inches, or about 2.50 inches. Although FIG. 7 shows only one flexible radius controller 35, it should be understood that in embodiments comprising a second flexible radius controller 36, the second flexible radius controller 36 may comprise a bend radius r the same as or similar to those recited above. Further, in embodiments comprising a second flexible radius controller 36, the flexible radius controller 35 and the second flexible radius controller 36 may have the same bend radius r. In other embodiments comprising a second flexible radius controller 36, the flexible radius controller 35 and the second flexible radius controller 36 may have a different bend radius r. The bend radius r may be approximately equal to the span of the corresponding second opening 330 or third opening 410.

Figure 8:
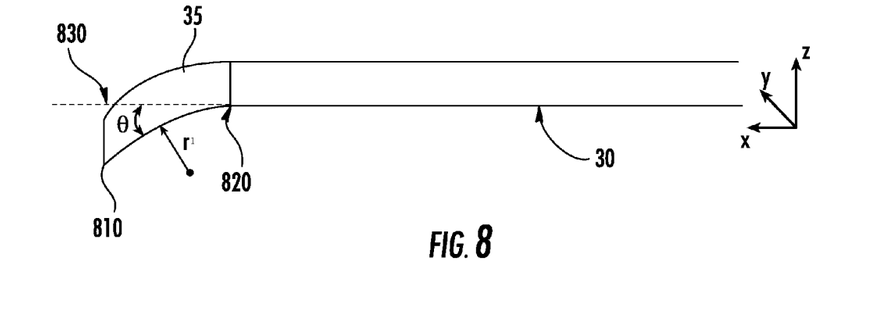
FIG. 8 is a front view of a drop handle and flexible radius controller according to one or more embodiments described herein.

According to embodiments, and with reference to FIG. 8, which is a front view of the flexible radius controller 35 and drop handle 30, the flexible radius controller 35 may be configured to slope with an angle θ extending from an end 820 of the of the flexible radius controller 35 connected to the drop handle 30 to a terminal end 810 of the flexible radius controller 35. Angle θ is measured from a hypothetical line 830 that is a lateral extension of the drop handle 30 taken at end 820 to the tangent of the curve formed by the flexible radius controller 35 as depicted in FIG. 8. The slope is configured to gently bend the cables 50 away from the cassette 1 as the flexible radius controller 35 guides the cables 50 out of the channel 310. If the angle of the slope θ is too large, the flexible radius controller 35 may not provide sufficient support to the cables 50 as they exit the channel 310, which may lead to tangling and other damage of the cables 50. However, if the angle of the slope θ of the flexible radius controller 35 is too small, the cables 50 may not have sufficient slack, thereby increasing the bending stress of the cables 50 as they are guided out of the channel 310 and away from the cassette 1. Accordingly, in some embodiments, the angle of the slope θ of the flexible radius controller 35 may be from greater than or equal to about 0° to less than or equal to about 90°, such as from greater than or equal to about 5° to less than or equal to about 60°. In other embodiments, the angle of the slope θ of the flexible radius controller 35 may be from greater than or equal to about 10° to less than or equal to about 40°, such as from greater than or equal to about 15° to less than or equal to about 20°. In other embodiments, the angle of the slope θ of the flexible radius controller 35 may be about 5°, about 10°, or about 15°. In yet other embodiments, the angle of the slope θ of the flexible radius controller 35 may be about 20°, about 25°, or about 30°. The flexible radius controller may have a bend radius $r^1$ defined by the downward slope of the flexible radius controller. The bend radius $r^1$ of the flexible radius controller 35 may be from greater than or equal to about 0.75 inches to less than or equal to about 3.0 inches, such as from greater than or equal to about 1.00 inches to less than or equal to about 2.75 inches. In other embodiments, the bend radius $r^1$ of the flexible radius controller 35 may be from greater than or equal to about 1.25 inches to less than or equal to about 2.50 inches, such as from greater than or equal to about 1.50 inches to less than or equal to about 2.25 inches. In other embodiments, the bend radius $r^1$ of the flexible radius controller 35 may be about 0.75 inches, about 1.00 inches, or about 1.25 inches. In yet other embodiments, the bend radius $r^1$ of the flexible radius controller 35 may be about 1.50 inches, about 2.00 inches, or about 2.50 inches. Although FIG. 8 shows only one flexible radius controller 35, it should be understood that in embodiments comprising a second flexible radius controller 36, the second flexible radius controller may comprise an angle of the slope θ similar to those recited above. Further, in embodiments comprising a second flexible radius controller 36, the flexible radius controller 35 and the second flexible radius controller 36 may have the same angle of the slope θ. In other embodiments comprising a second flexible radius controller 36, the flexible radius controller 35 and the second flexible radius controller 36 may have a different angle of the slope θ.

Thus, embodiments of cassettes and drop handles for optical cables have been described. The cassettes and drop handles may include a flexible radius controller configured to flex upon movement of the cassette or the drop handle to mitigate bend stresses on cables connected to a plurality of adapters in the cassette. Thereby, ease and efficiency of maintenance or installation operations for optical-fiber networking equipment may be facilitated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims.

It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A cassette for optical cables comprising:
a plurality of adapters that connect external devices to the cassette; and
a drop handle hingedly connected to the cassette and configured to inhibit access to the plurality of adapters when in a closed position and to allow access to the plurality of adapters when in an open position, the drop handle comprising:
a channel configured to guide cables connected to the plurality of adapters to at least one side of the cassette;
a first opening on a side proximate to the plurality of adapters and configured to allow the cables into the channel while maintaining their connection to the plurality of adapters;
a second opening on a side proximate to the first opening and configured to allow the cables to exit the drop handle on the at least one side of the cassette; and
a flexible radius controller connected to the second opening.

2. The cassette of claim 1, wherein the flexible radius controller is configured to flex when the cassette is removed from a housing.

3. The cassette of claim 1, wherein the flexible radius controller is made from a material having a Durometer hardness of from greater than or equal to about 50 to less than or equal to about 70.

4. The cassette of claim 3, wherein the flexible radius controller is made from a material having a Durometer hardness of about 60.

5. The cassette of claim 1, wherein the flexible radius controller is configured to bend toward the first opening at a bend radius of from greater than or equal to about 0.75 inches to less than or equal to about 3.0 inches.

6. The cassette of claim 5, wherein the flexible radius controller is configured to bend toward the first opening at a bend radius of about 1.5 inches.

7. The cassette of claim 1, wherein the flexible radius controller is made of a material selected from the group consisting of Evoprene, Kraton, and Santoprene.

8. The cassette of claim 7, wherein the flexible radius controller is made of a silicone-containing elastomer or Neoprene.

9. The cassette of claim 8, wherein the flexible radius controller is made of styrene-ethylene-butylene-styrene (SEBS).

10. The cassette of claim 1, wherein the flexible radius controller is overmolded onto the drop handle.

11. The cassette of claim 1, wherein the flexible radius controller is configured to slope from an end connected to the drop handle to a terminal end.

12. The cassette of claim 10, wherein the flexible radius controller is configured to slope at an angle from greater than or equal to about 0° to less than or equal to about 90°.

13. The cassette of claim 12, wherein the flexible radius controller is configured to slope at an angle of about 15°.

14. The cassette of claim 1, wherein the material of the flexible radius controller and the second flexible radius controller are the same.

15. The cassette of claim 1, wherein the material of the flexible radius controller and the second flexible radius controller are different.

16. A drop handle comprising:
a channel configured to guide cables connected to a plurality of adapters to a side of a cassette;
a first opening on a side proximate to the plurality of adapters and configured to allow the cables into the channel while maintaining their connection to the plurality of adapters;
a second opening on a side proximate to the first opening and configured to allow the cables to exit the drop handle on a side of the cassette;
a third opening that is proximate to the first opening and on an opposite side from the second opening, and a second flexible radius controller is connected to the third opening; and
a flexible radius controller connected to the second opening.

17. The drop handle of claim 16, wherein the flexible radius controller is made of a material selected from the group consisting of Evoprene, Kraton, and Santoprene.

18. The drop handle of claim 16, wherein the flexible radius controller is over molded onto the drop handle.

19. The drop handle of claim 16, wherein the flexible radius controller is configured to slope from an end connected to the drop handle to a terminal end.

20. The drop handle of claim 19, wherein the flexible radius controller is configured to slope at an angle of about 15°.

21. The drop handle of claim 16, wherein the flexible radius controller is configured to bend toward the first opening at a bend radius of greater than or equal to about 0.75 inches to less than or equal to about 3.0 inches, and has a Durometer hardness of from greater than or equal to about 50 to less than or equal to about 70.

* * * * *